United States Patent [19]

Gleim et al.

[11] Patent Number: 5,260,785
[45] Date of Patent: Nov. 9, 1993

[54] GRID-CORRECTION DEVICE FOR A TV SET

[75] Inventors: Günter Gleim, VS-Villingen; Jacques Chauvin, Mönchweiler, both of Fed. Rep. of Germany

[73] Assignee: Deutsche Thomson-Brandt GmbH, Villingen-Schwenningen, Fed. Rep. of Germany

[21] Appl. No.: 889,711

[22] Filed: May 28, 1992

[30] Foreign Application Priority Data

Nov. 4, 1989 [DE] Fed. Rep. of Germany . 3936/792.4

[51] Int. Cl.⁵ ............................................... H04N 9/28
[52] U.S. Cl. ................................................... 358/139
[58] Field of Search ................. 358/139, 10, 230, 250; 340/709

[56] References Cited

FOREIGN PATENT DOCUMENTS 0128590  5/1991  Japan .
2166028  4/1986  United Kingdom .

OTHER PUBLICATIONS

Patent Abstracts of Japan 60-185482 Sep. 1985.
Patent Abstracts of Japan 58-201486 Nov. 1983.

*Primary Examiner*—Victor R. Kostak
*Attorney, Agent, or Firm*—Joseph S. Tripoli; Eric P. Herrmann; Daniel E. Sragow

[57] ABSTRACT

A cursor for correcting the locations of points formed by the crossing horizontal and vertical lines of a grid arranged on the screen of a television receiver. The screen has a portion illuminated by a picture and a dark portion unilluminated by the picture. The grid also has at least one line of dark-points parallel to each edge of the picture and lying outside of the picture. The cursor is configured and dimensioned to extend into the picture when the cursor covers one of the dark-points.

5 Claims, 1 Drawing Sheet

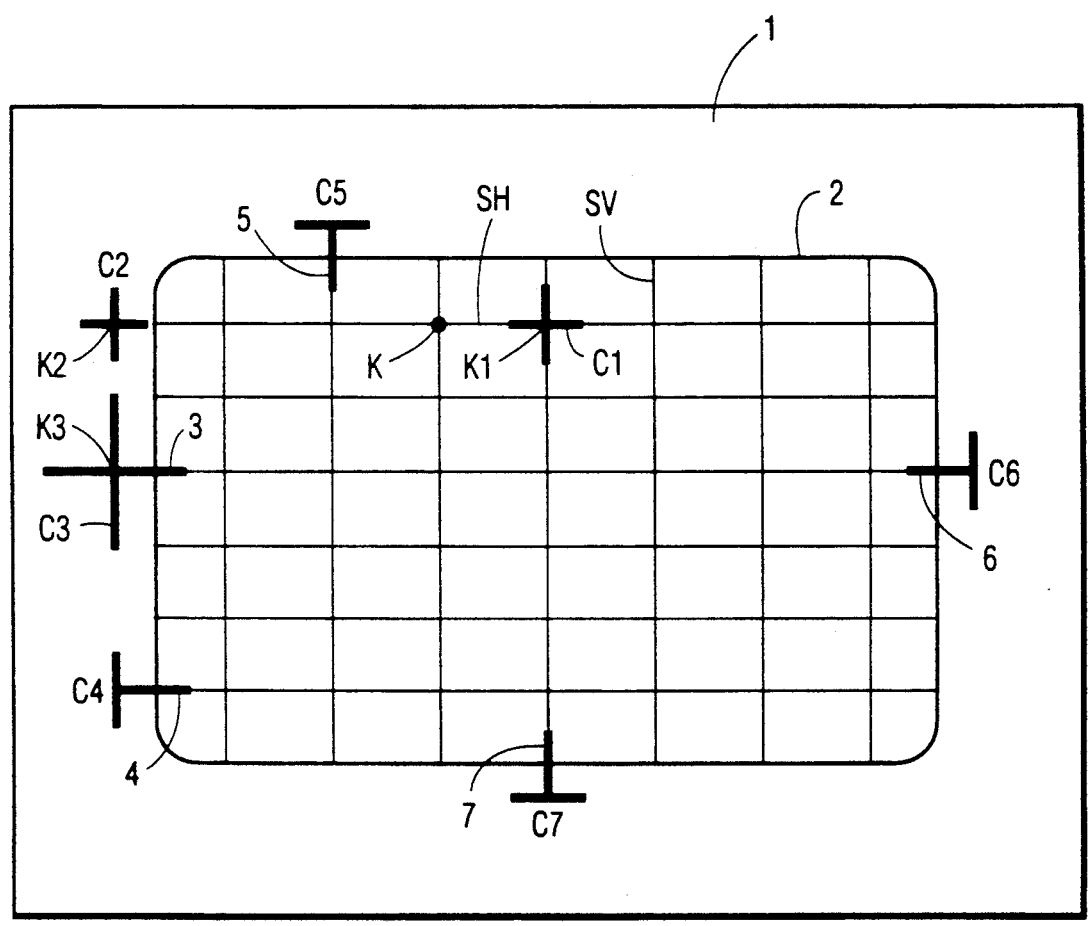

GRID-CORRECTION DEVICE FOR A TV SET

This is a continuation of PCT application PCT/EP 90/01905 filed Oct. 26, 1990 by Gunter Gleim and Jacques Chauvin and titled "Grid-Correction Device For A TV Set".

This invention is directed to a grid correction device for correcting positions on the screen of a television set. The "television set" as used herein includes any sort of screen type electronic picture reproduction device including the production of a television picture from signals received from a broadcasting service via an antenna, a monitor which is fed by an RGB signal, a CSCC signal, a signal separated into luminance signal and color subcarrier from any video signal source, or a projection television set. Such grid correction device is used for the correction of parameters which adversely affect the positions of points on the screen, for example correction of north/south distortions, east/west distortions, pillow distortions, non-linearity of the deflection and other geometry errors in the horizontal and vertical direction. One particular area of application is convergence (registry) correction in a television projection device in which the monochrome pictures from three different color picture tubes are projected onto one picture surface.

In the prior art a lattice (grid) composed of horizontal and vertical lines is displayed on the display screen. The crossings of the lines establish points which are accurately located on the screen in the absence of distortions. A cursor is visible on the screen and is used to identify particular crossing points of the vertical and horizontal lines. Correction values needed to correct the positioning of points displaced by various forms of distortion can be determined by using the cursor. The correction values are stored in a memory device, typically a microprocessor.

A visible image is displayed within a picture area of the screen scanning electron beams across the screen. No picture is produced outside of the displayed area because of appropriate blanking. However, deflection of the electron-beam continues during the blanking time. Therefore, it is possible to set the cursor to a crossing point which is within the deflection pattern, but which lies outside of the visible picture. The cursor on one of these crossing points would mark the border region of the picture where a correction value for a displaced point can be made. However, the cursor is outside of the picture area and thus is no longer visible. Accordingly, although the cursor in theory can serve to mark a picture location and to determine a correction value, in reality the cursor is "hidden somewhere" so that the operator does not know which picture area is marked. It is of course conceivable that the cursor could be briefly returned to the picture and then reset onto the crossing point located outside the picture and memorize the position. However, that is very laborious owing to the fineness of the lattice design and the multitude of crossing points and increases the risk of misadjustments.

It is an object of the invention to enable an unimpaired checking of the deflection parameter and determination of the correction values even when the cursor is located on a crossing point located outside of the visible picture area.

With the invention the cursor can be, for example, a rightangled symmetrical cross having equal length arms. The cursor can be dimensioned such that when its center is located on a crossing point outside of the picture, one arm projects into the visible picture. This configuration has the advantage that the cursor can have the same form on all picture edges and one need not be concerned with which side of the picture the cursor is positioned on. It is also possible to change the configuration of the cursor when it is positioned on a crossing point outside the picture. The cursor then preferably can have an unsymmetric configuration, such as a T-shape with long arm and a perpendicularly disposed short arm and with the long arm projecting into the picture. Accordingly, the T-shaped cursor must be orientated in a different direction for each of the four edges of the visible screen.

In the FIGURE:

The FIGURE shows a picture surface 1 on which a picture 2 is scanned. The current beams are blanked and the picture area is not illuminated outside the picture 2. A lattice design composed of horizontal lines SH and vertical lines SV, which produces a multitude of crossing points K, is represented within the picture 2. Moreover, a cursor C is presented which can be moved onto the individual crossing points K in an incremental fashion. The cursor C marks the crossing point K for which the convergence can be adjusted and the correction values stored. In the figure, the cursor C1 is illustrated on the crossing point K1.

A cross-shaped cursor C2 is shown positioned on the crossing point K2. This is the crossing point outside of the visible picture 2 closest to the left edge of the picture. The adjustment of the convergence and the storing of the correction values for this cursor position is beneficial and particularly for the left edge of the picture at the level of K2. However, the cursor C2 is no longer visible because of its position outside the picture 2.

Another cursor C3 is arranged on the crossing point K3 and has the same cross-shaped configuration as the cursor C2. However, the arms of the cursor are sufficiently long to insure that one of the arms projects into the picture 2 irrespective of which side of the picture the cursor is positioned on. The operator can adjust the convergence of the prints in the edges of the picture because of the visibility of the portion of the cursor C3 which extends into the picture 2.

A cursor C4 is T-shaped and has a long arm 4 which is directed towards the picture edge and extends into the picture 2 to mark the respective point in the picture. Accordingly, the arm 5 of the T-shaped cursor C5 located at the upper picture edge, the arm 6 of cursor C6 located at the right picture edge and the arm 7 of cursor C7 located at the lower picture edge project into the picture 2. The cursors C4, C5, C6, C7 can also consist of only the corresponding arms 4, 5, 6, 7, which project into the picture 2, because the other arm, which always lies parallel to the picture edge, is located outside the picture 2 and thus remains invisible. However, this is not advantageous because a cursor having two perpendicular arms is preferable for use within the picture area 2. Accordingly, if a cursor having a single arm is used outside of the picture 2 it should be special for that use and two different cursors would be required to locate all points of the picture.

We claim:

1. A cursor for correcting the locations of points formed by the crossing horizontal and vertical lines of a grid arranged on the screen of a television receiver, said screen having a portion illuminated by a picture and a dark portion unilluminated by said picture, said grid also having at least one line of dark-points parallel to each edge of said picture and lying outside of said picture, an improvement wherein said cursor is configured and dimensioned to extend into said picture when said cursor covers one of said dark-points.

2. The improvement of claim 1 wherein said cursor is shaped as a rightangle cross having four arms of equal length, the length of said arms being longer than the distance of said dark-points from the edge of said picture.

3. The improvement of claim 1 wherein said cursor has at least one arm extending into said picture.

4. The improvement of claim 3 wherein said cursor is T-shaped.

5. The improvement of claim 1 wherein said cursor when outside said picture is configured differently than when inside said picture.

* * * * *